United States Patent [19]

Beckey et al.

[11] Patent Number: 4,848,099
[45] Date of Patent: Jul. 18, 1989

[54] ADAPTIVE REFRIGERANT CONTROL ALGORITHM

[75] Inventors: Thomas J. Beckey, Edina; Lorne W. Nelson, Bloomington, both of Minn.

[73] Assignee: Honeywell Inc., Minneapolis, Minn.

[21] Appl. No.: 244,200

[22] Filed: Sep. 14, 1988

[51] Int. Cl.$^4$ .............................. F25B 41/00
[52] U.S. Cl. ...................... 62/212; 62/225; 236/78 D
[58] Field of Search ............. 236/78 D; 62/212, 225; 165/26

[56] References Cited

U.S. PATENT DOCUMENTS

| | | | |
|---|---|---|---|
| 3,778,025 | 12/1973 | Lane et al. | 236/78 D |
| 4,265,299 | 5/1981 | Harnish | 165/12 |
| 4,362,027 | 12/1982 | Barbier | 236/75 X |
| 4,448,038 | 5/1984 | Barbier | 62/225 X |
| 4,461,635 | 7/1984 | Rudebeck | 62/225 X |
| 4,475,686 | 10/1984 | Huelle et al. | 62/225 X |
| 4,500,035 | 2/1985 | Kuroda et al. | 62/225 X |
| 4,523,435 | 6/1985 | Lord | 236/78 D |
| 4,545,212 | 10/1985 | Noda | 62/225 X |
| 4,571,951 | 2/1986 | Szymaszek | 62/225 X |

Primary Examiner—William E. Wayner
Attorney, Agent, or Firm—Clyde C. Blinn

[57] ABSTRACT

A refrigeration system comprises a compressor, a condenser, an evaporator, an accumulator, and an adjustable controllable expansion valve. An electronic control system monitors the value of superheat and accordingly provides an electrical control signal to adjust the controllable expansion valve in order to maintain a set point superheat value. An unfiltered path is provided to ensure expedient response when the system starts operation and when dynamic changes occur. A filtered path is provided to reduce hunting, or oscillations about the set point, of the superheat value during steady state operation.

20 Claims, 2 Drawing Sheets

ADAPTIVE REFRIGERANT CONTROL ALGORITHM

BACKGROUND OF THE INVENTION

A typical refrigeration control system consists of a compressor to compress gaseous refrigerant, a condenser in which the refrigerant liquefies, an evaporator in which the liquid refrigerant transforms back to a gaseous state, an accumulator which collects refrigerant, and an adjustably controllable expansion valve to control the flow of liquid refrigerant to the evaporator. The expansion valve is controlled to maintain a constant superheat value such that high thermal efficiency is achieved while ensuring that liquid refrigerant does not flow out of the evaporator which would be potentially damaging to the compressor. Superheat is defined as the difference between the vapor temperature of the refrigerant and the saturation temperature of the refrigerant when it is at its liquid-vapor transition point. Two sensors are required to determine the superheat value at the exit of the evaporator. One sensor is used to obtain the vapor temperature and the other sensor is used to obtain the saturation refrigerant temperature.

The expansion valve is controlled by electronic means which senses the superheat value and correspondingly provides an output to change the opening or closing of the valve and hence maintain the value of sensed superheat to a set point. In order for the electronic control means to be highly responsive to adjust for start-up transients and for variations in parameters during steady state operation, an unfiltered, high control gain is provided by the control.

Problems occur in this prior art control mechanism in that the high control gain may result in hunting of the superheat value because of the time lag between changes in the expansion valve and corresponding changes in superheat. Hunting is defined as the condition when the superheat value, instead of stabilizing, oscillates continuously about the set point, resulting in decreased efficiency and possible passing of liquid refrigerant to the compressor.

SUMMARY OF THE INVENTION

The present invention alleviates the problems incurred due to excessive hunting of the superheat by providing signal conditioning means for modifying the sensed superheat signal as a function of a selected characteristic of the sensed superheat signal to provide a modified superheat signal. The modified superheat signal is subtracted from a desired superheat set point signal, and the difference in the two signals provides an output control signal for the expansion valve.

In a preferred embodiment of the invention, the signal conditioning means includes separate paths which have variable authority, or variable transfer functions, depending upon the refrigeration system conditions. One of the paths is filtered and is given authority when it is desired to decrease the amplitude, or overall swings, of the superheat oscillations. The filtered path partakes in creating a delayed and less responsive control to variations in the sensed superheat signal. Another path is unfiltered and is given authority initially at system start-up and during the time when a given steady state stability of superheat is reached. This second path ensures expedient response to dynamic changes in the system by providing a non-delayed feedback signal to the expansion valve. After system start-up, the respective transfer functions, or authority, of the unfiltered path and the filtered path are variable and are functions of the rate of change in the sensed superheat signal with respect to time, or the superheat differential with respect to time.

DESCRIPTION OF THE INVENTION

Figure 1:
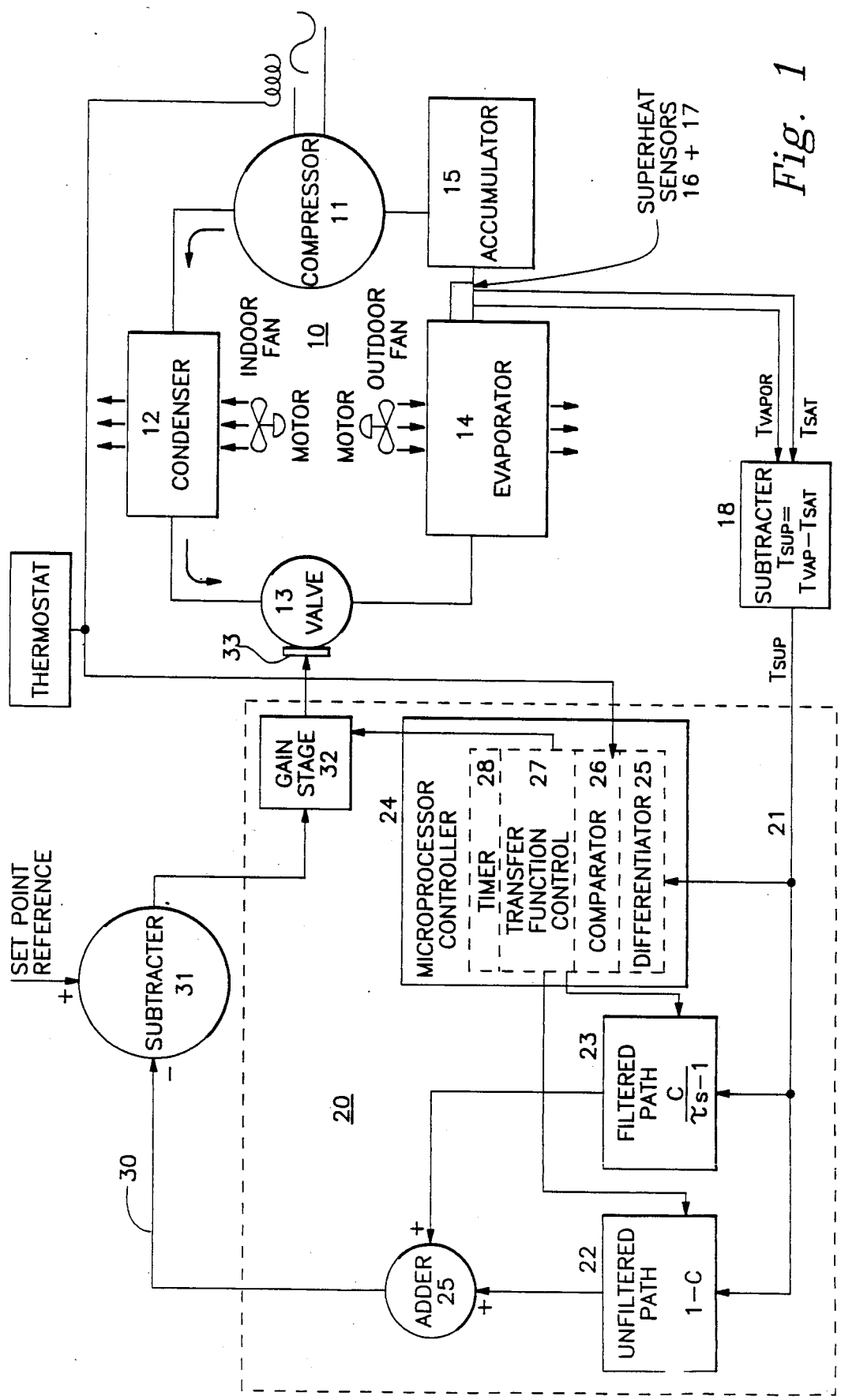
FIG. 1 is a schematic view of a preferred embodiment of the control connected to a heat pump refrigeration system in heating mode.

Referring to FIG. 1, a typical refrigeration or heat pump system 10 with which the present invention adapts itself has a compressor 11 to compress gaseous refrigerant, a condenser 12 to liquefy the two-state refrigerant, an electronically controlled expansion valve 13 to limit the circulated flow of refrigerant, an evaporator 14 to evaporate liquid refrigerant, and an accumulator 15 which collects refrigerant to be re-circulated. A means for sensing the value of superheat is provided by the two superheat sensors 16 and 17 and the subtracter 18. A sensed superheat signal representative of the value of superheat, as determined in subtracter means 18, is applied to the input line 21.

The sensing of the superheat value could be accomplished using a variety of methods known to those skilled in the art. One of these methods would require one of the superheat sensors 16 or 17 to measure the temperature at the exit of the evaporator 14 and the other sensor to measure the pressure within evaporator 14. The temperature at the exit of the evaporator 14 is indicative of the vapor temperature of the exiting refrigerant, and the pressure within the evaporator 14 is indicative of the saturation temperature of the refrigerant.

The expansion valve position is controlled by an actuator 33 which is responsive to an electrical output control signal provided by the present invention. A preferred embodiment of the present invention has panel 20 with an input line 21 receiving a sensed superheat signal, representative of the value of superheat in evaporator 14. The sensed superheat signal is connected to a signal conditioning means including an unfiltered path or means 22, such as an amplifier having voltage gain of $1-c$, connected in parallel to a filtered path or means 23, such as a single pole low pass filter having a DC gain of $c$ and time constant of $\tau$. The transfer functions of both the unfiltered path 22 and the filtered path 23 are electronically adjustable. Specifically, the gain of the unfiltered path 22 and the gain and time constant of the filtered path 23 can be varied in response to an electrical transfer function control signal.

The sensed superheat signal is also provided to an input circuit of a control means 24 whose control function could be accomplished by way of a microprocessor with support circuitry. Control means 24 is responsive to the operation of the refrigeration system to control the relative transfer of the sensed superheat signal through unfiltered means 22 and filtered means 23. A differentiator 25 within control means 24 provides a differentiation function to monitor the rate of change of the sensed superheat signal with respect to time. This could be accomplished using a microprocessor by sampling the sensed superheat signal in fixed time intervals and providing an output signal representative of the overall change in the sensed superheat signal during that time period, referred to as the discrete slope of the superheat signal. The output signal from the differentiator 25 is compared to a reference signal or threshold slope in comparator 26. The output signal representative of the discrete slope of the superheat signal is compared to the threshold slope so that the transfer function control 27 of the control means 24 can determine the appropriate overall transfer function needed to induce the proper opening or closing of the expansion valve 13. For example, if the discreet slope of the superheat signal were greater than the threshold slope, the transfer function control 27 would provide signals to affect the respective transfer functions of the unfiltered path 22 and the filtered path 23 such that the filtered path 23 would have a more dominant influence on the conditioning of the output control signal to be provided to the expansion valve 13. An extension of the invention would also provide a control signal from the transfer function control 24 which would cause a decrease in the amplification of the gain stage 32 to further modify the effect of the sensed superheat signal on the control of expansion valve 13. Thus, the overall result due to the conditioning of the sensed superheat signal in this example is a feedback signal to the actuator 33 which is lower in amplitude and delayed. This signal causes less fluctuation in the position of the expansion valve and also delays the opening or closing of the valve, both of which contribute to stabilizing the superheat. The delay contributes to the stabilization of the superheat when it decreases the phase difference between a change in the expansion valve position and a corresponding change in superheat.

The respective outputs of paths 22 and 23 are combined in an adder means 25 whose output at 30 is a modified superheat signal. This modified superheat signal is subtracted from a set point value in subtracter means 31. The output of the subtracter means 31 is applied to a gain stage 32 which changes the level of the control signal to the expansion valve 13 and whose gain is a function of the control means 24. The output of the gain stage 32 is an output feedback signal to be applied to the control input of the expansion valve control actuator 33.

OPERATION OF THE INVENTION

Referring to a preferred embodiment of the present invention shown in FIG. 1, a signal is provided to the control input to actuator 33 of adjustable expansion valve 13 connected within the heat pump refrigeration system 10 shown in its heating mode. The sensed superheat signal from subtracter mean 18 is electrically connected to the input of unfiltered path 22, the input of filtered path 23, and an input of the control 24.

When control 24 detects system start-up, the respective transfer functions of unfiltered path 22 and filtered path 23 are assigned by control 24 such that unfiltered path 22 has authority over filtered path 23 for a given amount of time determined by timer 28. When unfiltered path 22 has authority over filtered path 23, the resulting modified superheat signal, as combined by the adder 25, is predominantly influenced by unfiltered path 22. This condition would exist whenever the magnitude of the gain of unfiltered path 22 is greater than the magnitude of the gain of filtered path 23. This could be accomplished in a system with an unfiltered transfer function of $1-c$ and a filtered transfer function of $$\frac{c}{\tau s + 1}$$

by assigning the value of c to 0.2 initially. The amplification of the gain stage 32 would also be assigned by the transfer function control 27 to provide a relatively high level of amplification.

The purpose for this initial assignment of the overall transfer function of the present invention after system start-up is to provide an unfiltered, relatively high feedback gain to ensure immediate and substantial response by the expansion valve 13. This immediate response by the expansion valve will contribute to high system efficiency by quickly allowing the system to reach the desired level of superheat.

Figure 2:
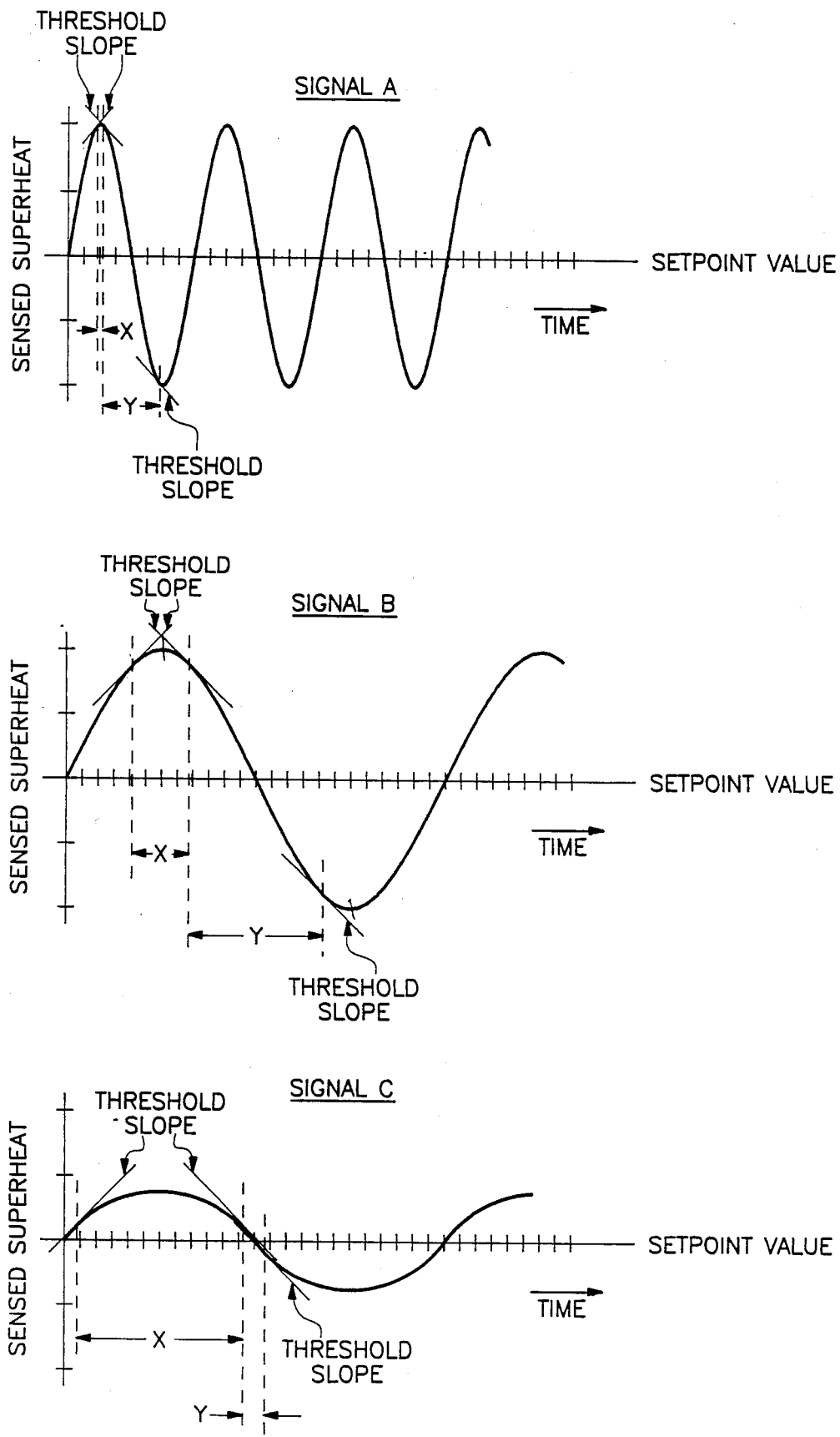
FIG. 2 is a group of curves representing possible sensed superheat values versus time oscillating about a set point value.

When the given amount of time after system start-up has elapsed, the present invention provides an appropriate feedback signal to the refrigeration system by monitoring the change in the sensed superheat signal with respect to time in discreet steps and modifying the amplification of the gain stage 32 and the respective authority of the unfiltered path 22 and filtered path 23 accordingly. FIG. 2 shows three possible signals representing the sensed superheat signal as provided by the output of subtracter 18 at input line 21. Tangent to each of these sinusoidal signals are shown the positive and negative values of the threshold slope whose magnitude has been arbitrarily chosen for this illustration.

The value of the threshold slope in application is chosen to optimize the desired performance of the system. The threshold slope could also be made variable and responsive to other refrigerant system operating conditions.

As is apparent from each signal of FIG. 2, the duration of time shown as time period Y, during which the magnitude of the discreet change in the sensed superheat signal with respect to time or discreet slope is greater than the shown threshold slope, illustrates the condition existing during which the filtered path 23 is given more authority and the amplification of the gain stage 32 is reduced by the control 24. The time period X, illustrating the duration during which the discreet slope is less than the threshold slope, shows the condition existing during which the unfiltered path 22 is given more authority and the amplification of gain stage 32 is raised by the transfer function control 27.

Comparing signal A to signal B reveals that the time duration Y occurs for a higher percentage of a cycle of the signal (half cycle duration given by the sum of time periods X and Y) for signal A than for signal B. Similarly, the time duration Y of signal B occurs for a higher percentage of its cycle than for signal C. Thus, for a superheat signal represented by signal A, the filtered path 23 will be given more authority and the amplification of the gain stage 32 reduced for a greater percentage of time than would a superheat signal represented by signal B or signal C. This assignment in the transfer function of the system reduces the swing and creates a delay in the output signal provided to change the valve position, and consequently results in reducing the hunting of the superheat set point value during steady state.

As the discrete slope of the sensed superheat with respect to time reduces below the threshold slope for a greater percentage of its entire period, as would occur with the less oscillatory and lower amplitude signals represented by signal B and signal C, then authority is increasingly transferred to the unfiltered feedback path 22, and the amplification of gain stage 32 is raised. This assignment of transfer function ensures that the overall system will respond quickly to outside parameter changes which cause dynamic change in the value of sensed superheat. This control causes the refrigeration system to establish a compromise between low superheat oscillation during steady state and quick response when system parameter variations occur.

It is apparent from the description of this embodiment that several variations could be adopted which would result in essentially the same control function. For example, a single feedback path with an adjustable time delay and gain could replace and serve the functions of both the unfiltered and filtered paths. Alternatively, a plurality of feedback paths, each having a fixed transfer function, could be selectively controlled to condition the sensed superheat signal.

While the foregoing specification describes a preferred embodiment of the invention, other embodiments will be apparent to those skilled in the art, without departing from the spirit of the invention which is limited only by the following claims:

We claim:

1. A control apparatus for a refrigeration system, the refrigeration system having an evaporator, a compressor, a condenser, and an adjustable controlled expansion valve connected in series, and having superheat sensing means for providing a sensed superheat signal, said control apparatus comprising:

control means adapted to be connected to the superheat sensing means, said control means responsive to the characteristics of the sensed superheat signal and having an output; and signal conditioning means adapted to be connected to the superheat sensing means for responding to the sensed superheat signal and connected to control the expansion valve, said signal conditioning means connected to said output of said control means for modifying effect of the sensed superheat signal on the control of the expansion valve, said control means comprising a transfer function control for modifying the transfer characteristics of said signal conditioning means.

2. Apparatus of claim 1 wherein said control means is responsive to the rate of change of the sensed superheat signal with respect to time for providing a first output signal indicative of the rate of change of the sensed superheat signal with respect to time.

3. Apparatus of claim 2 wherein said control means comprises a comparator means to provide a second output signal, said comparator means for comparing said first output signal to a reference signal.

4. Apparatus of claim 3 wherein said reference signal has a level which is variable.

5. Apparatus of claim 4 wherein said reference signal has a level indicative of a selected characteristic of the refrigerant system operating conditions.

6. Apparatus of claim 1 wherein said control means comprises timing means responsive to the operation of the refrigeration system for providing a period of time during which the transfer characteristics of said signal conditioning means are set at a predetermined level.

7. Apparatus of claim 1 wherein said signal conditioning means changes the level of said sensed superheat signal.

8. Apparatus of claim 1 wherein said signal conditioning means changes the phase of said sensed superheat signal.

9. A control apparatus for a refrigeration system, the refrigeration system having an evaporator, a compressor, a condenser, and an adjustable controlled expansion valve connected in series, and having superheat sensing means for providing a sensed superheat signal, said control apparatus comprising:

control means adapted to be connected to the superheat sensing means, said control means responsive to the characteristics of the sensed superheat signal and having an output; and signal conditioning means adapted to be connected to the superheat sensing means for responding to the sensed superheat signal and connected to control the expansion valve, said signal conditioning means connected to said output of said control means for modifying effect of the sensed superheat signal on the control of the expansion valve, said signal conditioning means comprising a filtered means connected to said sensed superheat signal for providing a filtered output signal, and an unfiltered means connected to said sensed superheat signal for providing an unfiltered output signal.

10. Apparatus of claim 9 wherein said control means comprises a transfer function control connected to said filtered means and to said unfiltered means, for modifying the transfer characteristics of said filtered and unfiltered means.

11. Apparatus of claim 9 wherein the control apparatus further comprises means for adding said filtered output signal to said unfiltered output signal, for providing a modified superheat signal.

12. Apparatus of claim 11 wherein the control apparatus further comprises a means for setting a superheat reference signal for comparing said superheat reference signal to said modified superheat signal.

13. Apparatus of claim 12 wherein the control apparatus further comprises subtracter means for comparing said superheat reference signal to said modified reference signal, said subtracter means providing an output control signal indicative of a relationship between said superheat reference signal and said modified superheat signal.

14. Apparatus of claim 13 wherein the control apparatus further comprises means for changing the level of said output control signal.

15. Apparatus of claim 14 wherein said means for changing the level of said output control signal comprises means for changing the level as a function of the rate of change of the sensed superheat signal with respect to time.

16. Apparatus of claim 14 wherein said control means comprises a transfer function control, connected to said means for changing the level of said output feedback signal, for modifying the transfer characteristics of said means for changing the level of said output feedback signal.

17. A control for a refrigeration system having an evaporator and an adjustable controllable expansion valve comprising:

means for sensing a value of superheat to provide a first output signal proportional to said superheat value;

unfiltered means with an input electrically connected to said first output of said superheat sensing means for providing a second output;

filtered means with an input electrically connected to said first output of said superheat sensing means for providing a third output;

summation means for sensing a combination of said second output of said unfiltered path and said third output of said filtered path for providing a fourth output;

means for providing a set point signal;

means for sensing a difference between said fourth output of said summation means and said set point signal for providing control signal;

means for connecting said control signal to the control of the expansion valve; and means responsive to the operation of the refrigeration system to control the authority of said unfiltered means and said filtered means.

18. The invention of claim 17 wherein said means for connecting said control signal to the control of the expansion valve includes a means for changing the level of said control signal.

19. The invention of claim 17 wherein said means responsive to the operation of the refrigeration system includes a means for differentiating said first output of said superheat sensing means with respect to time for providing a reference signal to said means responsive to the operation of the refrigeration system.

20. The invention of claim 17 wherein said means responsive to the operation of the refrigeration system includes a timing means for providing a period of time beginning from system start-up during which authority is assigned to said unfiltered means.

* * * * *